(12) United States Patent
DeVore et al.

(10) Patent No.: US 9,171,175 B2
(45) Date of Patent: Oct. 27, 2015

(54) DATA PROGRAMMING CONTROL SYSTEM WITH SECURE DATA MANAGEMENT AND METHOD OF OPERATION THEREOF

(75) Inventors: Scott DeVore, Kirkland, WA (US); Andrew B. Caley, Redmond, WA (US); Ngoc Nicholas, Redmond, WA (US)

(73) Assignee: Data I/O Corporation, Redmond, WA (US)

( * ) Notice: Subject to any disclaimer, the term of this patent is extended or adjusted under 35 U.S.C. 154(b) by 635 days.

(21) Appl. No.: 12/851,938

(22) Filed: Aug. 6, 2010

(65) Prior Publication Data
US 2011/0035587 A1 Feb. 10, 2011

Related U.S. Application Data

(60) Provisional application No. 61/231,817, filed on Aug. 6, 2009.

(51) Int. Cl.
| | | |
|---|---|---|
| G06F 21/00 | (2013.01) | |
| G06F 21/60 | (2013.01) | |
| G06F 9/44 | (2006.01) | |
| H04L 29/06 | (2006.01) | |
| H04L 29/08 | (2006.01) | |

(52) U.S. Cl.
CPC ............ *G06F 21/606* (2013.01); *G06F 8/20* (2013.01); *H04L 63/0272* (2013.01); *H04L 63/0428* (2013.01); *H04L 67/34* (2013.01); *H04L 2463/041* (2013.01)

(58) Field of Classification Search
CPC ... H04L 63/0428; H04L 63/0272; G06F 8/20; G06F 21/606
USPC ............................ 713/164–165, 189; 726/15
See application file for complete search history.

(56) References Cited

U.S. PATENT DOCUMENTS

| | | | |
|---|---|---|---|
| 7,017,004 B1 * | 3/2006 | Calligaro et al. | 711/102 |
| 7,069,452 B1 * | 6/2006 | Hind et al. | 713/1 |
| 7,237,103 B2 * | 6/2007 | Duncan | 713/1 |
| 7,340,642 B1 * | 3/2008 | Coatney | 714/5.1 |
| 7,440,452 B1 | 10/2008 | Giniger et al. | |
| 7,533,186 B2 | 5/2009 | Raman | |
| 7,536,548 B1 | 5/2009 | Batke et al. | |
| 7,934,660 B2 * | 5/2011 | Yeakley et al. | 235/472.01 |
| 8,676,957 B2 * | 3/2014 | Motoyama | 709/224 |
| 2003/0097426 A1 * | 5/2003 | Parry | 709/220 |

(Continued)

OTHER PUBLICATIONS

Alexander et al.; A secure active network environment architecture: realization in SwitchWare; Published in: Network, IEEE (vol. 12, Issue: 3); pp. 37-45; Date of Publication: May/Jun. 1998; IEEE Xplore.*

(Continued)

*Primary Examiner* — Bradley Holder
(74) *Attorney, Agent, or Firm* — Ishimaru & Associates LLP

(57) ABSTRACT

A method of operation of a data programming control system includes: providing a secure data management host server coupled to a network; encrypting a contract manufacturer job by the secure data management host server, including: providing a memory image file, creating a programmer encrypted file from the memory image file, and encrypting permissions and the programmer encrypted file to form the contract manufacturer job; decrypting the contract manufacturer job transmitted through the network by a secure data management local server; transmitting the programmer encrypted file by the secure data management local server to a device programmer; and programming a device with the memory image file decrypted by the device programmer.

14 Claims, 6 Drawing Sheets

(56) References Cited

U.S. PATENT DOCUMENTS

| | | | |
|---|---|---|---|
| 2006/0230271 A1* | 10/2006 | Milton et al. | 713/175 |
| 2007/0050622 A1 | 3/2007 | Rager et al. | |
| 2008/0049942 A1* | 2/2008 | Sprunk et al. | 380/283 |
| 2008/0201661 A1* | 8/2008 | Haynes et al. | 715/810 |
| 2008/0301433 A1 | 12/2008 | Vito | |
| 2009/0099879 A1 | 4/2009 | Ouimet | |
| 2010/0008510 A1* | 1/2010 | Zayas | 380/283 |
| 2011/0010720 A1* | 1/2011 | Smith et al. | 718/102 |

OTHER PUBLICATIONS

Schaefer; Secure trade lane: a sensor network solution for more predictable and more secure container shipments; Published in: Proceeding OOPSLA '06 Companion to the 21st ACM SIGPLAN symposium on Object-oriented programming systems, languages, and applications; 2006; pp. 839-845; ACM Digital Library.*

International Search Report for Application No. PCT/US2010/044729 dated Apr. 1, 2011.

* cited by examiner

DATA PROGRAMMING CONTROL SYSTEM WITH SECURE DATA MANAGEMENT AND METHOD OF OPERATION THEREOF

CROSS-REFERENCE TO RELATED APPLICATION(S)

This application claims the benefit of U.S. Provisional Patent Application Ser. No. 61/231,817 filed Aug. 6, 2009, and the subject matter thereof is incorporated herein by reference thereto.

TECHNICAL FIELD

The present invention relates generally to an integrated circuit programming system, and more particularly to a system for managing proprietary data for contract manufacturing.

BACKGROUND ART

The consumer electronic devices that are so popular today, such as cellular telephones, personal data assistants, personal video players, global positioning systems, and hand held video games, utilize programmed memory devices in order to operate. When these devices are assembled, the information that will reside in the memory must be programmed by a device programmer. Typically many such device programmers may be used by contract manufacturers that may perform the assembly of the consumer electronic devices under the direction of the original equipment manufacturer.

The original equipment manufacturers of electronic products are increasingly concerned about how they can protect their intellectual property (IP) from unauthorized disclosure or other use. While data security and encryption techniques have been available for various data communication applications, data protection has heretofore not been applied to the programmable content of integrated circuit devices.

Today, most of an original equipment manufacturer's IP may take the form of data stored in non-volatile semiconductor memories and controllers residing inside the firm's products. Device programming, or "flashing" as it is often called, is a manufacturing process whereby the original equipment manufacturer's IP is encoded into the semiconductor device inside the final product.

The programming process has largely been uncontrolled and therefore subject to human error resulting in frequent rework due to the use of the wrong data file, mistakes in setting up the process, and mistakes in handling failed devices. The process often lacks integrity in that there is no closed-loop method to ensure configuration control or demonstrate traceability.

Further, the original equipment manufacturers do not have a known-secure means to protect their IP as it is transferred from their location to the remote manufacturing locations and to the final destination inside the programmable devices of the firm's products. The inappropriate use or disclosure of the IP may represent a loss of millions of dollars to the original equipment manufacturers.

Pirated versions of the IP may be used to produce unauthorized models of popular electronic devices. For example, a Computer Crime and Security Survey by the Computer Security Institute and the Federal Bureau of Investigation found that the most serious financial losses occurred through the theft of proprietary data with losses of over $100 million reported.

Protection of proprietary data refers to design code, device memory image files, public and private keys, serial numbers, or other unique information that is ultimately transferred into a programmable device either before or after the integrated circuit device is mounted on a printed circuit board. The printed circuit board will ultimately reside inside the electronic product that is assembled by the contract manufacturing company.

In order to be programmed, the proprietary data must usually be rendered into a format that can be used by the device programming equipment and somehow transferred to the programming site. This format is typically in the form of a device memory image file and transport mechanisms can be anything from physical transport of data media, such as removable disks or solid state memory sticks, containing the device memory image file or electronic transfer via email or other mechanism over data networks.

Once delivered to the programming site, the proprietary data is often stored for use until the programming job is run. Since production may take place over many days, often interrupted by production for other products, the proprietary data must often be stored at the programming site in between production runs leaving it exposed for unauthorized use or mishandling.

These processes of transporting and storing the proprietary data present many opportunities where it can be intercepted and copied or modified by unauthorized parties. Once the proprietary data have arrived at the programming site, there is an additional problem in that the data and programming equipment may be used for unauthorized production of devices and products that use the proprietary data.

Despite all of the efforts taken to control the dissemination and usage of proprietary data, it is still possible for programming equipment or the programmable device to malfunction resulting in non-operational integrated circuit devices that must be discarded as scrap. Falsified reports of scrap or lost devices provide one possible way to conceal unauthorized use of the proprietary data.

The IP owner requires the capability to remotely monitor production activity and received post-production audits to confirm the appropriate use of the proprietary data. It is difficult to monitor that only authorized copies of the proprietary data were used and production quantities of the integrated circuit devices programmed with the IP were produced as established by the IP owner.

Local and multi-national companies and contract manufacturers dispersed around the globe routinely share the IP owner's proprietary data as a matter of routine production flow. IP owners historically have not had a means to secure and maintain full control of their intellectual property that is transferred into programmable integrated circuit devices.

Thus, a need still remains for an integrated circuit programming system with secure data management. In view of the increasing concern about unlicensed products and inappropriate use of proprietary data, it is increasingly critical that answers be found to these problems.

In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a data programming control system including: providing a secure data management host server coupled to a network; encrypting a contract manufacturer job by the secure data management host server, including: providing a memory image file, creating a programmer encrypted file from the memory image file, and encrypting permissions and the programmer encrypted file to form the contract manufacturer job; decrypting the contract manufacturer job transmitted through the network by a secure data management local server; transmitting the programmer encrypted file by the secure data management local server to a device programmer; and programming a device with the memory image file decrypted by the device programmer.

The present invention provides a data programming control system comprising: a memory image file; a secure data management host server coupled to a network for sending the memory image file in an encrypted format; a secure data management local server for receiving the encrypted format of the memory image file transmitted through the network; a device programmer networked to the secure data management local server; and a device programmed with the memory image file decrypted by the device programmer.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
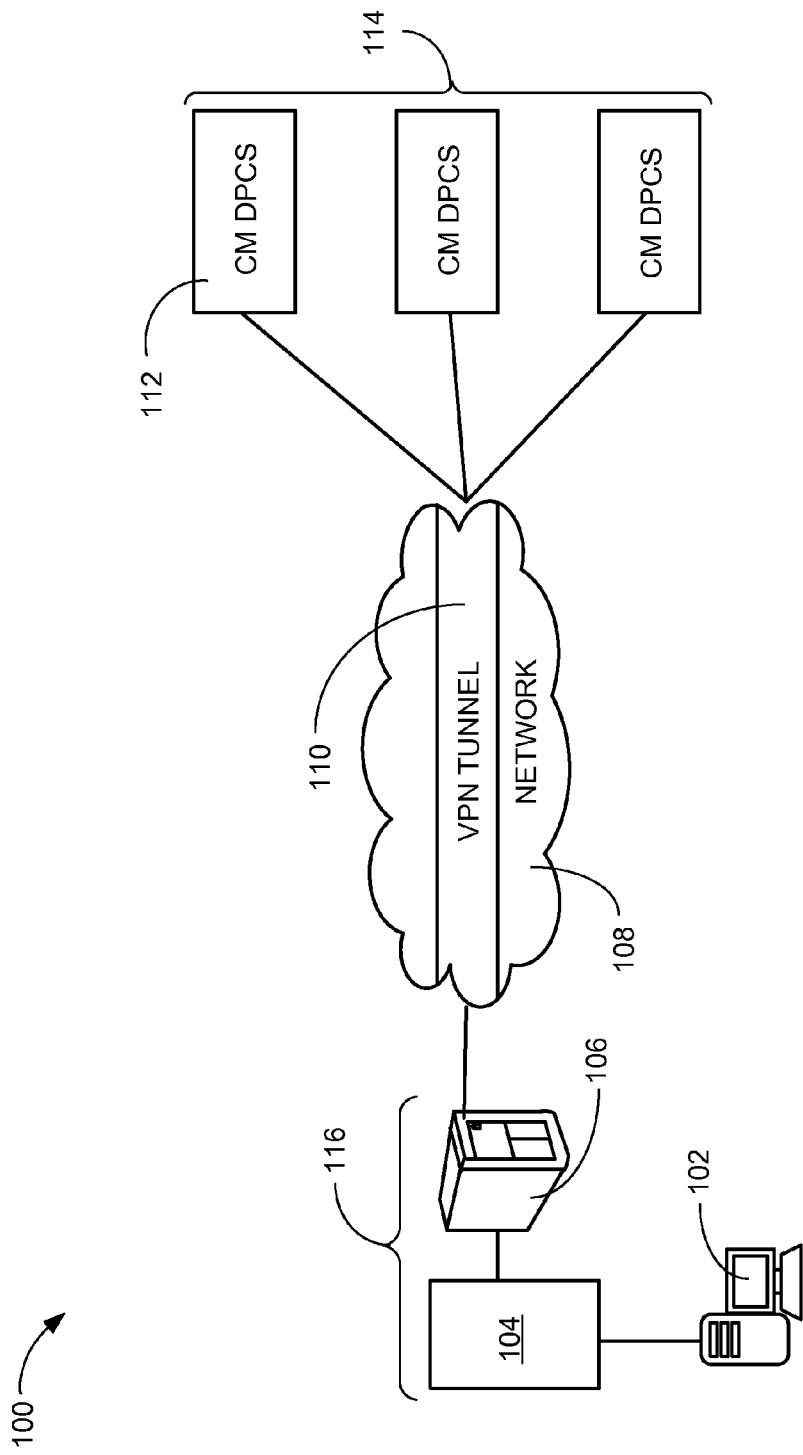
FIG. 1 is a block diagram of a data programming control system with secure data management, in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

For expository purposes, the term "horizontal" as used herein is defined as a plane parallel to the plane or surface of the programmer work surface, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures. The term "on" means that there is direct contact among elements.

The term "processing" as used herein includes transportation of parts, mounting of reels, activating parts loaders, packaging finished parts, and managing scrapped parts. The term "contract manufacturer" may include any electronic manufacturing services provider in the world as selected by an original equipment manufacturer including internal resources, of the original equipment manufacturer, that are remotely located.

Referring now to FIG. 1, therein is shown a block diagram of a data programming control system 100 with secure data management, in an embodiment of the present invention. The block diagram of the data programming control system 100 depicts a human-machine interface 102, such as a work station, coupled to a job creation database 104. The job creation database 104 may be accessed by a secure data management (SDM) host server 106.

It is understood that the job creation database 104 may reside within the SDM host server 106, but is shown separately for clarity. It is further understood that the job creation database may be the result of executing software packages, such as TaskLink® a registered trademark of the Data I/O Corporation, which may provide additional processing information to the actual device data image.

The SDM host server 106 may contain hardware and execute processes that produce a secure job (not shown). The SDM host server 106 may be coupled to a network 108, such as a wide area network, world wide web or Internet, and activate a virtual private network (VPN) tunnel 110 in order to transmit the secure job to a contract manufacturer (CM) 112. The contract manufacturer 112 may be part of a world wide supply chain 114 or internal resources, of an original equipment manufacturer (OEM) 116, that are remotely located.

The SDM host server 106 may utilize a symmetric encryption key to associate with individual device programmers (not shown). The information sent to the individual device programmers may include the actual data to be programmed, target device parameters, and status update instructions. The information sent to the contract manufacturers 112 may include the list of the individual device programmers allocated to the job, job permissions, and the required timing of the finished products.

While a single element of the VPN tunnel 110 is shown, this is an example only and any number of the VPN tunnel 110 may be utilized to communicate with the contract manufacturers 112. Also by way of an example three of the contract manufacturers 112 are shown, but it is understood that any number of the contract manufacturers 112 or internal resources of the original equipment manufacturer 116 may be addressed through the VPN tunnel 110.

Figure 2:
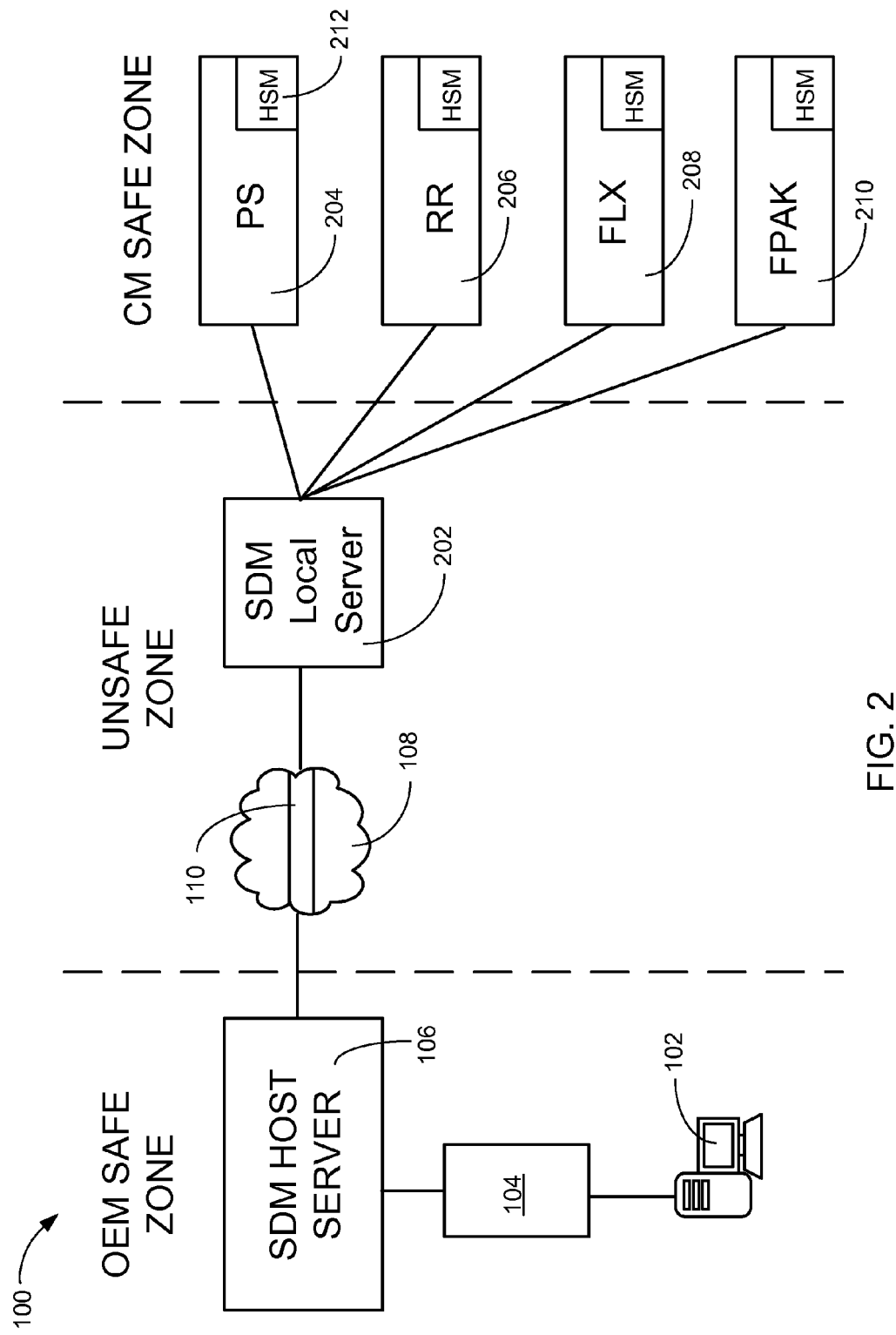
FIG. 2 is a zone map of the data programming control system of FIG. 1.

Referring now to FIG. 2, therein is shown a zone map of the data programming control system 100, of FIG. 1. The zone map of the data programming control system 100 depicts an OEM safe zone having the human-machine interface 102, such as a work station, coupled to the job creation database 104, which is further coupled to the SDM host server 106.

The SDM host server 106 may perform the tasks of encryption, key exchange, permissions management, layers of encryption and collection of statistical data. The SDM host server 106 may reside in a secure facility such that its data content that is un-encrypted is not accessible to outside individuals or organizations.

The SDM host server 106 may be coupled to the network 108 and provide the VPN tunnel 110 capability by hardware, software, or the combination thereof. The use of the VPN tunnel 110 may restrict access of the information being transferred therethrough. The network 108 falls into an unsafe zone.

The unsafe zone may allow opportunity for an unauthorized third party to intercept information transmitted from the SDM host server 106. An SDM local server 202 located within the contract manufacturer 112 facility also resides within the unsafe zone because the owner of the intellectual property (IP) sent by the SDM host server 106 cannot control access to or exposure of his IP.

In order to mitigate the exposure of the unsafe zone, all IP related data is encrypted. The symmetrical encryption key has been established through an asymmetrical encryption protocol.

The SDM local servers 202 also provide a secure data repository for local copies of the data to be programmed by device programmers. This local repository is provided to ensure that production is not delayed by data transport speed restrictions or temporary loss of connectivity to the network 108.

The encrypted files stored in the repository may be used many times for various programming jobs over a period of days, weeks, or months. Storing the encrypted files locally may provide instant access, by the networked programmers, to the encrypted files. While the security of the SDM local server is not known to the IP owner, the security of the encrypted IP is assured by an encryption key known only to the SDM host server and the targeted device programmer.

A first device programmer 204, a second device programmer 206, a third device programmer, 208 and a fourth device programmer 210 may all be networked to the SDM local server 202. Each of the device programmers 204 through 210 may represent a different model or type of programmer, such as an automated programmer (PS), an automated in-line programming feeder (RR), a self-contained automated system (FLX), or a networked programming system (FPAK).

A high-speed security manager (HSM) 212 may reside in each of the device programmers 204 through 210. The HSM 212 may be implemented in software, hardware, or a combination thereof and may support the security of the encrypted IP.

The HSM 212 may use a password hidden in the firmware, of each of the device programmers 204 through 210, in order to decrypt the IP when it is used to program the devices, such as memory or processors. Additionally the HSM 212 may provide support for decryption, programming, reporting, encryption, key storage, or a combination thereof.

It is understood that while the FIG. 2 only shows a single connection for each of the device programmers, any number or combination of the first device programmer 204, the second device programmer 206, the third device programmer, 208 or the fourth device programmer 210 may be networked to the SDM local server 202. It is further understood that any sub-set of the device programmers 204 through 210 networked to the SDM local server 202 may be activated for a particular programming job and only those activated programmers have the ability to decrypt the encrypted IP.

Figure 3:
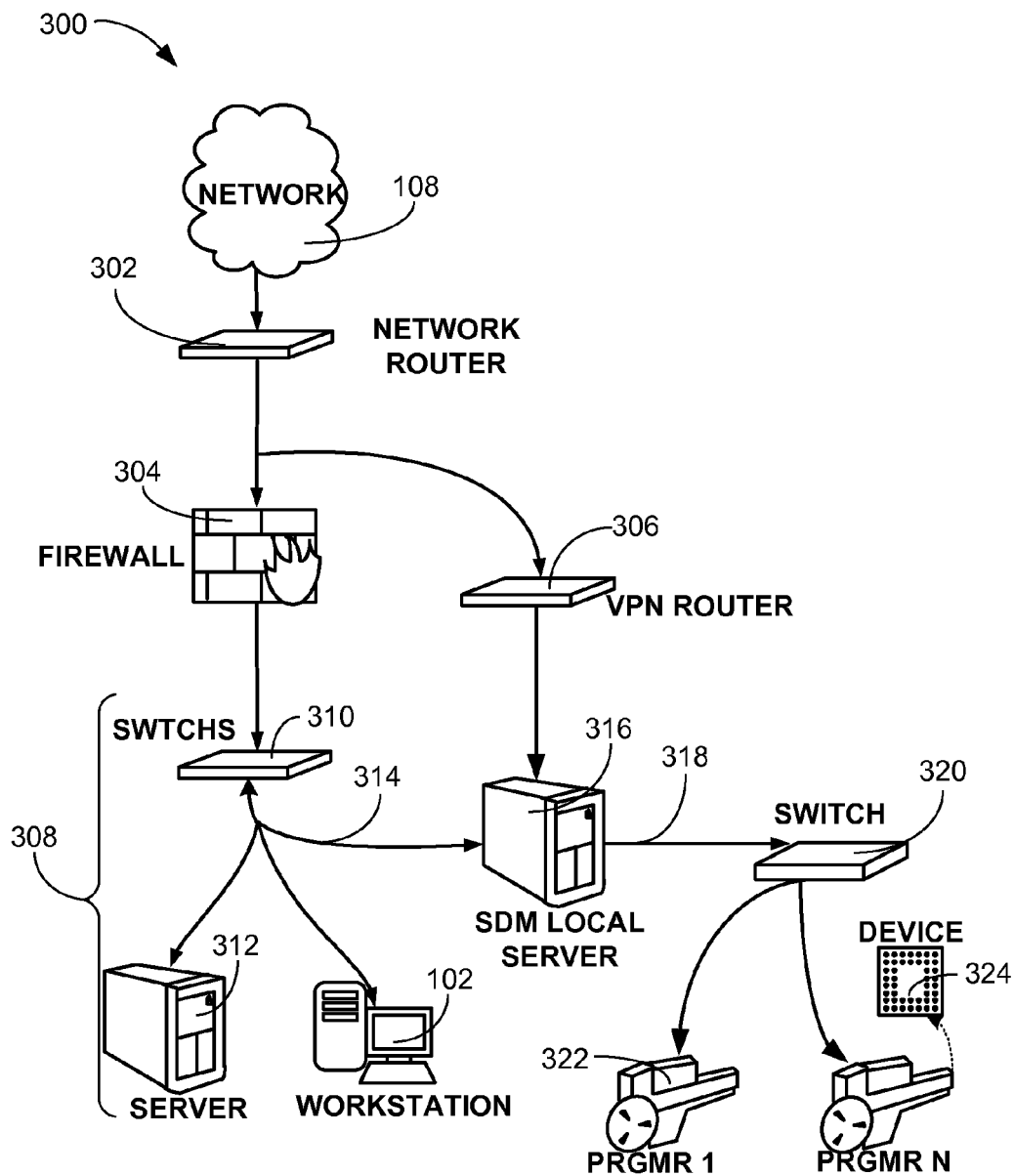
FIG. 3 is a block diagram of a data programming control system in an embodiment of the present invention.

Referring now to FIG. 3, therein is shown a block diagram of a CM data programming control system 300 in an embodiment of the present invention. The block diagram of the CM data programming control system 300 depicts the network 108 connected to a network router 302. The network router 302 may be located at the site of one of the contract manufacturers 112, of FIG. 1, and may be coupled to a firewall 304 and a VPN router 306.

The firewall 304 may protect a CM internal network 308 from access by any unauthorized external users. The CM internal network 308 may include switches 310 that provide internal network communication between business servers 312, the human-machine interfaces 102, and a business link 314 coupled to an SDM local server 316.

The SDM local server 316 may support three separate network connections. The business link 314 may provide access to the SDM local server 316 for tasks including status collection, submission of non-secure jobs, and system maintenance. The SDM local server 316 may also be connected to the VPN router 306, for delivery of secure jobs, and a programming device network 318.

The programming device network 318 may include a device programmer switch 320 having connections to device programmers 322. While two similar versions of the device programmers 322 are shown, this is an example only and a diverse selection of models of the device programmers 322 may be coupled to the device programmer switch 320. It is also understood that while the FIG. 3 depicts only two of the device programmers 322 coupled to the device programmer switch 320, any number of the device programmers 322 may be connected.

The CM internal network 308 may communicate with the original equipment manufacturer 116, of FIG. 1, through secure or non-secure means in order to maintain a business relationship. A secure communication path may include the business servers 312 or the human-machine interfaces 102 accessing the business link 314 to communicate through the SDM local server 316.

The SDM local server 316 may open communication through the VPN tunnel 110, of FIG. 1, through the network 108 in order to relay a secure message, in an encrypted format, to the original equipment manufacturer 116, of FIG. 1. While the secure communication path is an example, it is understood that the CM internal network 308 may support other secure means of communication as a standard business practice.

The programming device network 318 may support secure communication of job information between the SDM local server 316 and the device programmers 322. An encrypted message containing job specific data may include a quantity of devices 324 to program, the data to be programmed to the devices 324, status reporting requirements, and parametric information about the devices 324 to be programmed.

Communications between the device programmers 322 and the SDM local server 316 may be encrypted so that it is only available to the original equipment manufacturer 116 or it may be unencrypted for general use by the CM internal network 308. These options may be determined by the job definitions and permissions originally established in the SDM local server 316.

While the above described network configuration supports the present invention, other network configurations are possible. While the SDM local server 316 will support attachment to three separate networks, the present invention may be supported on less than three networks as this is not a requirement for operation of the CM data programming control system 300.

Figure 4:
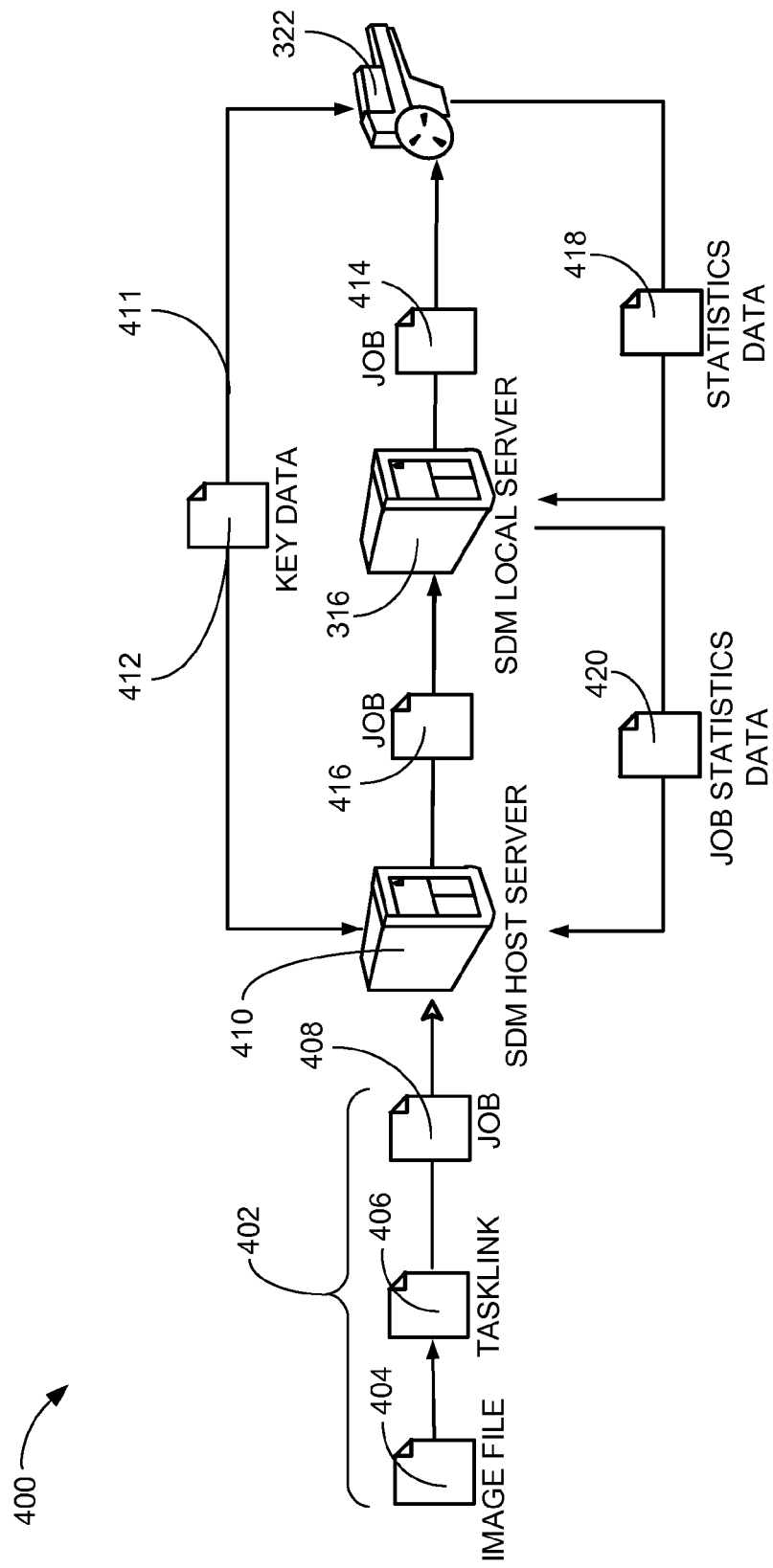
FIG. 4 is a work flow diagram of a data programming control system with secure data management of the present invention.

Referring now to FIG. 4, therein is shown a work flow diagram of a data programming control system 400 with secure data management of the present invention. The work flow diagram of the data programming control system 400 depicts a job assembly 402 including a memory image file 404 coupled to a job creation process 406 for creating a programming job 408.

The programming job 408 may be submitted to an SDM host server 410, such as the SDM host server 106 located at a facility (not shown) of the original equipment manufacturer 116 of FIG. 1. The SDM host server 410 may prepare the programming job 408 by determining which of the device programmers 322 available from the CM data programming control system 300, of FIG. 3, are to be used.

The determination of which of the device programmers 322 are to be used may be made by a key exchange process 411. The key exchange process 411 requires that the SDM host server 410 communicates with the device programmers 322 and that they respond through the VPN tunnel 110, of FIG. 1.

An identification password, such as a 128 bit password, may be embedded in the firmware of the device programmers 322 and in the software of the SDM host server 410 to allow authentication of exchanged messages. For example, the identification password can allow authentication of the exchanged messages during the key exchange process. This extra level of security may prevent unauthorized access to information by a deception known as a man-in-the-middle attack.

The SDM host server 410 may encrypt the information from the memory image file 404. A programmer encrypted file 414 may be generated, by using an encryption key data 412, for each of the device programmers 322 selected to execute the programming job 408. The programmer encrypted file 414 may include status and permission requirements for the execution of the programming job 408.

A CM job 416 may then be assembled by compiling the programmer encrypted files 414 and additional requirements from the job creation process 406. The CM job 416 may be received by the SDM local server 316.

The SDM local server 316 may decrypt the CM job 416, send the embedded information, from the job creation process 406, to the business servers 312, of FIG. 3, by the business link 314, of FIG. 3. When the resources, such as allocated time, the devices 324, of FIG. 3, to be programmed, and specific units of the device programmers 322, are all available the SDM local server 316 may transmit the correct version of the programmer encrypted file 414 to each of the device programmers 322 involved.

The device programmers 322 will receive the appropriate version of the programmer encrypted file 414, decrypt the file based on the encryption key data 412 for the device programmer 322 selected to execute the programming job 408. During the execution of the programming job 408, a statistical data message 418 may be encrypted with the encryption key data 412 and sent from the device programmer 322 to the SDM local server 316.

The statistical data message 418 may include a digital signature identifying the device programmer 322 that supplied the information. The inclusion of the digital signature prevents any falsification that might divert programmed devices or allow un-programmed devices to be counted as scrap.

The interval and the number the statistical data message 418 may be included in the programmer encrypted file 414, as part of the permissions and requirements, which was sent to the device programmer 322. A job statistical data message 420 may be transmitted from the SDM local server 316 to the SDM host server 410. The job statistical data message 420 may include the compilation of the statistical data message 418 from all of the device programmers 322 involved in the programming job 408.

It has been discovered that the permission management may allow the OEM 116 to control which of the device programmer 322 or group of the device programmers 322 may be used for the programming job 408. Further the permission management may restrict the number of devices to be programmed or limit the time and date that the job may be run. The permission management allows full selective control of the execution of the programming job 408.

A final synopsis of the statistical data message 418 may be transmitted by each of the device programmers 322 involved in the programming job 408. At the completion of the programming job 408, the encryption key data 412 is not invalidated but may be replaced by executing the key exchange process 411 before the execution of another of the CM job 416.

It has been discovered that a secure audit of the statistical data message 418 may be provided by the SDM local server compiling the statistical data messages 418 from all of the device programmers 322 involved in executing the programming job 408. Typical information in the statistical data message 418 may include: the number of devices programmed, programming yield values broken down by system and socket, distributions of programming error types, the disposition of each device that has passed through the programmer, and any unique identification data stored within the devices, such as serial numbers.

It is understood that the communication link between the SDM host server 410 and the SDM local server 316 is through the VPN tunnel 110. As well it is understood that the key exchange process 411 takes place through the VPN tunnel 110, which is not shown in order to simplify the FIG. 4.

Figure 5:
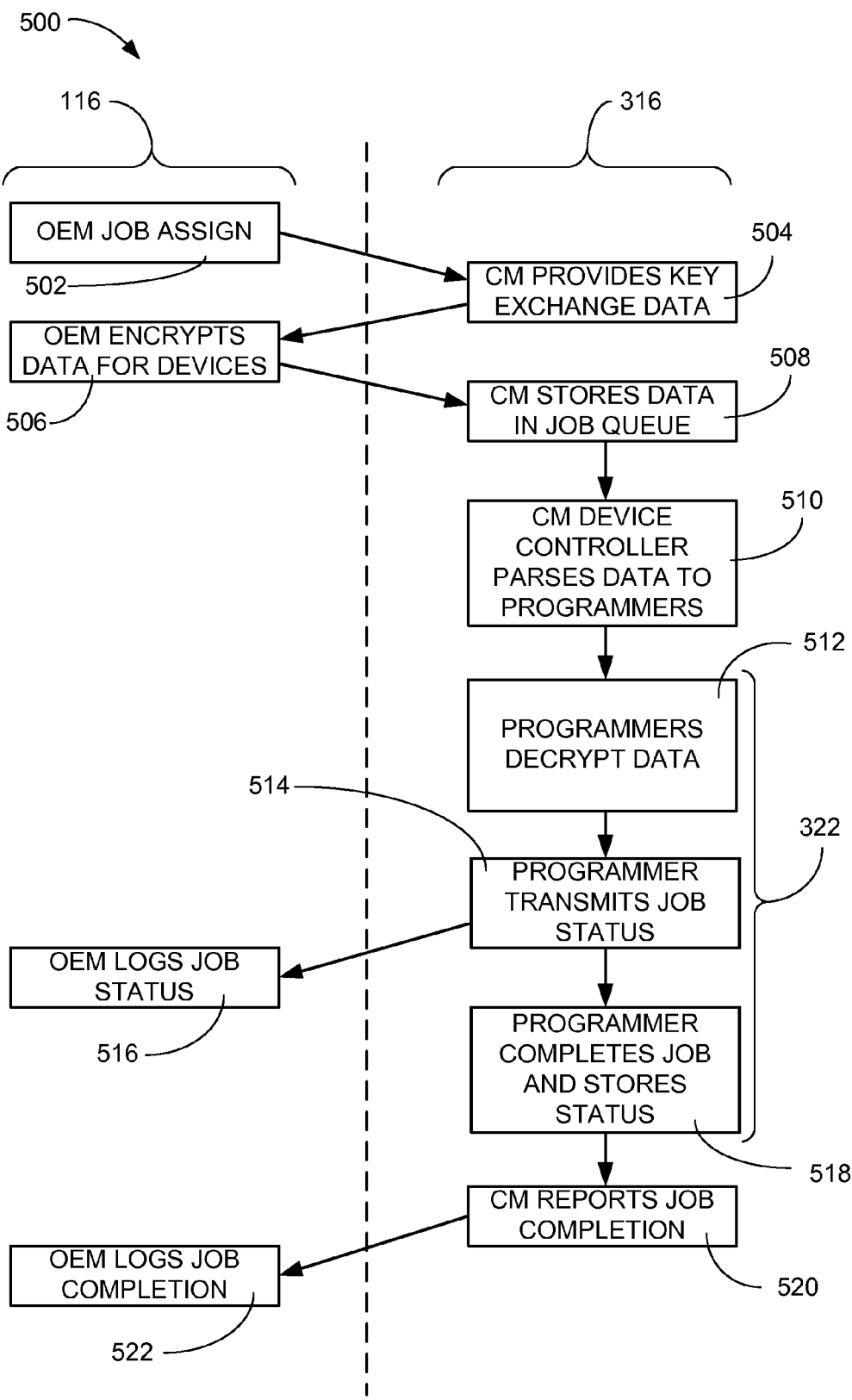
FIG. 5 is a communication exchange diagram for operation of a data programming control system.

Referring now to FIG. 5, therein is shown a communication exchange diagram for operation of a data programming control system 500. The communication exchange diagram for operation of the data programming control system 500 depicts the original equipment manufacturers 116 side and the SDM local server 316 side.

An "OEM job assignment" 502 may be initiated by the programming job 408, of FIG. 4, entry into the job assembly 402, of FIG. 2. The "OEM job assignment" 502 may be initiated once the key exchange process 411, of FIG. 4, has been completed with the SDM local server 316, of FIG. 3, through the VPN tunnel 110, of FIG. 1.

A "CM stores data in job queue" 508 may cause the SDM local server 316 to queue the CM job 416 based on the permissions and requirements of the particular job. When the permissions are satisfied, a "CM device controller parses data to programmers" 510 to cause the SDM local server may transfer the job files to the device programmers 322.

Within the device programmers 322, a "programmers decrypt data" 512 may cause the encrypted files to be decrypted. Only those of the device programmers 322 that are selected for this job will be able to decrypt the files and start the programming of the devices.

A "programmer transmits job status" 514 may cause the device programmers 322 that are engaged in the current job to transmit the statistical data message 418, of FIG. 4, to the SDM local server 316. Based on the permissions and requirements of the particular job, an intermediate status message may be transmitted between the SDM local server 316 and the SDM host server 410. If an intermediate status message is transmitted, an "OEM logs job status" 516 may save the statistical data message 418 for later processing or tracking.

A "programmer completes job and stores status" 518 may be activated by the programming of the final device to satisfy the permissions and requirements of the CM job 416. The final portion of the statistical data message 418 may be sent from the device programmers 322 to the SDM local server 316.

A "CM reports job completion" 520 may compile the entire statistical data from all of the device programmers 322 that participated in the CM job 416 and transmits the compiled information as the job statistical data message 420. An "OEM logs job completion" 522 may perform clean-up operations and prepare for the programming job 408, of FIG. 4, waiting in the queue.

Figure 6:
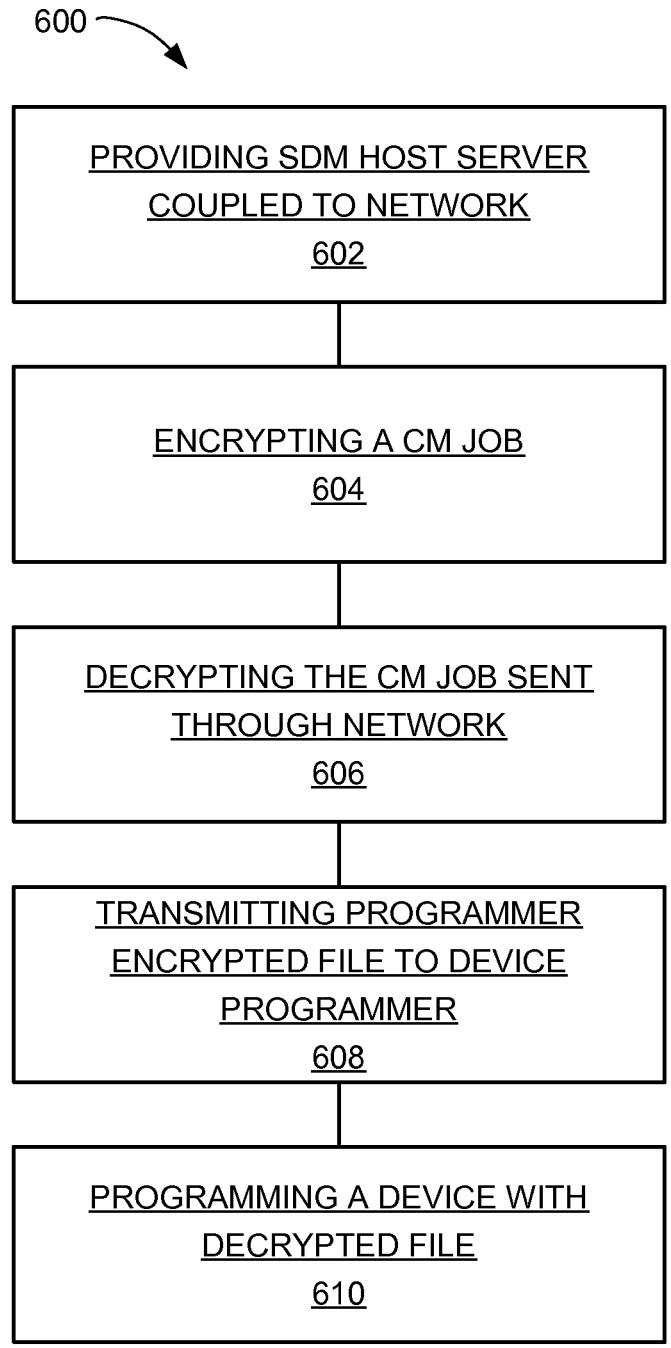
FIG. 6 is a flow chart of a method of operation of a data programming control system with secure data management in an embodiment of the present invention.

Referring now to FIG. 6, therein is shown a flow chart of a method 600 of operation of a data programming control system in an embodiment of the present invention. The method 600 includes: providing a secure data management host server coupled to a network in a block 602; encrypting a contract manufacturer job by the secure data management host server, including: providing a memory image file, creating a programmer encrypted file from the memory image file, and encrypting permissions and the programmer encrypted file to form the contract manufacturer job in a block 604; decrypting the contract manufacturer job transmitted through the network by a secure data management local server in a block 606; transmitting the programmer encrypted file by the secure data management local server to a device programmer in a block 608; and programming a device with the memory image file decrypted by the device programmer in a block 610.

The resulting method, process, apparatus, device, product, and/or system is straightforward, cost-effective, uncomplicated, highly versatile and effective, can be surprisingly and unobviously implemented by adapting known technologies, and are thus readily suited for efficiently and economically manufacturing data programming control system with secure data management fully compatible with conventional manufacturing methods or processes and technologies.

Another important aspect of the present invention is that it valuably supports and services the historical trend of reducing costs, simplifying systems, and increasing performance without sacrificing the security of the intellectual property that uses the data programming control system.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a data programming control system comprising:
providing a secure data management host computer server coupled to a network including securing at an original equipment manufacturer site the secure data management host computer server;
encrypting a contract manufacturer job, by the secure data management host computer server, including:
providing a memory image file,
creating a programmer encrypted file from the memory image file, and
encrypting permissions and the programmer encrypted file to form the contract manufacturer job;
transmitting the contract manufacturer job by the secure data management host computer server;
decrypting the contract manufacturer job transmitted through the network by a secure data management local server including determining an asymmetrical encryption key;
transmitting the programmer encrypted file by the secure data management local server to a device programmer including transmitting on a programming device network between the secure data management local server and the device programmer;
exchanging an encryption key data between the secure data management host computer server and the device programmer including exchanging a password between the secure data management host computer server and the device programmer;
programming a device with the memory image file decrypted by the device programmer including programming a memory or a processor with the memory image file; and
sending a statistical data message to the secure data management local server, wherein the statistical data message is from the device programmer involved in a programming job created based on the memory image file and includes a digital signature identifying the device programmer.

2. The method as claimed in claim 1 further comprising forming a virtual private network tunnel through the network between the secure data management host computer server and the secure data management local server including performing a key exchange process through the virtual private network tunnel.

3. The method as claimed in claim 1 further comprising compiling the statistical data message sent by the device programmer by the secure data management local server including reporting a number of the devices programmed, programming yield values, distributions of programming error types, a disposition of each of the devices that has passed through the device programmer, and unique identification data stored within the devices.

4. The method as claimed in claim 1 further comprising selecting a first device programmer, a second device programmer, a third device programmer, a fourth device programmer, or a combination thereof for decrypting the programmer encrypted file including limiting the encryption key data to only the device programmers selected for the contract manufacturer job.

5. A data programming control system comprising:
a secure data management host computer server coupled to a network for securing at an original equipment manufacturer site, for encrypting a contract manufacturer job including providing a memory image file, creating a programmer encrypted file from the memory image file, and encrypting permissions and the programmer encrypted file to form the contract manufacturer job, and for transmitting the contract manufacturer job;

a secure data management local server for receiving the contract manufacturer job from the secure data management host computer server, decrypting the contract manufacturer job transmitted through the network including determining an asymmetrical encryption key, and for transmitting the programmer encrypted file;

a device programmer, networked to the secure data management local server, for receiving the programmer encrypted file from the secure data management local server, for sending a statistical data message to the secure data management local server, and for exchanging an encryption key data between the secure data management host computer server and the device programmer including exchanging a password between the secure data management host computer server and the device programmer, wherein the statistical data message is from the device programmer involved in a programming job created based on the memory image file and includes a digital signature identifying the device programmer, and the programmer encrypted file is transmitted on a programming device network between the secure data management local server and the device programmer; and a device programmed with the memory image file decrypted by the device programmer, wherein the device includes a memory or a processor.

6. The system as claimed in claim 5 further comprising a contract manufacturer internal network coupled to the secure data management local server.

7. The system as claimed in claim 5 further comprising a virtual private network router between the secure data management host computer server and the secure data management local server.

8. The system as claimed in claim 5 further comprising a programming device network between the secure data management local server and the device programmers.

9. The system as claimed in claim 5 further comprising a human-machine interface coupled to the secure data management local server.

10. The system as claimed in claim 5 further comprising a job creation database in the secure data management host computer server having the memory image file.

11. The system as claimed in claim 10 further comprising a contract manufacturer internal network coupled to the secure data management local server includes switches and business servers coupled through a business link.

12. The system as claimed in claim 10 further comprising a virtual private network router between the secure data management host computer server and the secure data management local server includes a firewall between the virtual private network router and a contract manufacturer internal network.

13. The system as claimed in claim 10 further comprising a programming device network between the secure data management local server and the device programmers includes a device programmer switch.

14. The system as claimed in claim 10 further comprising a human-machine interface coupled to the secure data management local server includes a workstation coupled to the secure data management local server.

* * * * *